(12) United States Patent
Colby

(10) Patent No.: US 6,543,475 B2
(45) Date of Patent: Apr. 8, 2003

(54) PNEUMATIC VALVE AND REGULATOR APPARATUS AND METHOD FOR REGULATING COMPRESSED AIR THEREFOR

(76) Inventor: Daniel H. Colby, 509 Landmeier Rd., Elk Grove Village, IL (US) 60007

( * ) Notice: Subject to any disclaimer, the term of this patent is extended or adjusted under 35 U.S.C. 154(b) by 0 days.

(21) Appl. No.: 09/843,041

(22) Filed: Apr. 26, 2001

(65) Prior Publication Data

US 2001/0054441 A1 Dec. 27, 2001

Related U.S. Application Data

(60) Provisional application No. 60/200,144, filed on Apr. 27, 2000.

(51) Int. Cl.[7] .............................................. G05D 16/10
(52) U.S. Cl. ................................. 137/505.25; 124/74
(58) Field of Search ..................... 124/74; 137/505.25, 137/505.27, 505.28

(56) References Cited

U.S. PATENT DOCUMENTS

| | | | | |
|---|---|---|---|---|
| 3,437,109 A | * | 4/1969 | Carlson et al. | 137/505.25 |
| 4,791,957 A | * | 12/1988 | Ross | 137/505.25 |
| 5,036,878 A | * | 8/1991 | Fournillon et al. | 137/505.25 |
| 5,522,421 A | * | 6/1996 | Holt et al. | 137/505.25 |
| 5,613,483 A | * | 3/1997 | Lukas et al. | 124/74 |
| 5,669,369 A | * | 9/1997 | Scott | 124/74 |

* cited by examiner

*Primary Examiner*—Stephen M. Hepperle
(74) *Attorney, Agent, or Firm*—Baniak Pine & Gannon

(57) ABSTRACT

A single stage regulator is disclosed wherein a Belleville disk spring configuration is utilized to regulate an input working pressure as high as 4,500 PSI, to an output delivery pressure of about 700 to 1,000 PSI. The single stage regulator can be used on Paintball guns, markers and similar devices powered by compressed gas.

1 Claim, 3 Drawing Sheets

PNEUMATIC VALVE AND REGULATOR APPARATUS AND METHOD FOR REGULATING COMPRESSED AIR THEREFOR

This application claims the benefit of application No. 60/200,144, filed Apr. 27, 2000.

TECHNICAL FIELD OF THE INVENTION

The present invention relates to a pneumatic valve and regulator apparatus and method for regulating the output delivery pressure from a pressure vessel, and more particularly the present invention relates to a pneumatic type regulator containing a pressure activated demand valve configured to be attached to a Paintball gun or a (commonly referred to) marker in addition to a other pressure activated device and a method for receiving input working pressure of up to 4,500 pounds per square inch (PSI), and regulating the output delivery pressure to approximately 700 to 1,000 PSI.

BACKGROUND OF THE INVENTION

In recent years, as the popularity of Paintball games has grown, there has been a proliferation of different types of Paintball guns, air guns or markers, and the devices that are used in conjunction with these markers. These new markers and related devices have become necessary due to the increased ejection capability of the markers and the demands placed on the player/user of the markers increased in order to remain competitive.

The early types of markers and related devices provided an adequate level of performance, however, the onset of more experienced players, along with challenging Paintball gun tournaments, now provides an arena where more sophisticated markers and peripherals are required to compete.

As such, there is a great need for devices that speed up a player's level of play while still providing the necessary safety and accuracy needed during play. Further, there is a need for a device that allows a player certain capabilities before, during, and after competitions and tournaments. Included in these capabilities is a regulator containing infinite multiple preset output pressures (within the design range), tamper proof pressure settings, the ability to easily and safely remove pressure vessels and integrated regulator under full pressure, and a regulator that is field serviceable without removing the regulator from the pressure vessel.

In addition, a need exists for a device that allows the fail-safe removal of a pressure vessel, under full pressure, so that the vessel can be recharged or filled, and returned to the marker. In addition, there is a need for a player to be able to place a different vessel onto the marker while in full play conditions under severe time constraints. This capability addresses the need that arises during various conditions of use/play.

There is a demand for a high-precision regulator that addresses these inadequacies that are present in current regulators.

SUMMARY OF THE INVENTION

Accordingly, the main object of the present invention is to provide a pneumatic valve and regulator that addresses the above listed disadvantages and others.

The regulator of the present invention is a high quality, stainless steel, and high strength aluminum, cost affordable regulator designed to accept inlet pressures ranging as high as 4,500 pounds PSI, and is factory set to a particular output pressure of around 700 to 1,000 PSI. The regulator has been carefully machined from high tensile strength stainless steel and aluminum alloy. The present invention has been equipped with industry standard CGA 320 threading, which will allow it to be mounted into any standard female CGA 320 profile adapter.

The present invention relates to a regulator having a pressure activated demand valve, a pre-loaded Belleville disk stack designed to produce a predetermined output pressure, and an adjustable metering orifice. The adjustable metering orifice is not be accessible from the outside of the regulator.

It is another aspect of the present invention that the demand valve of the regulator is a spring-loaded, self-centering mechanical device, which initiates gas flow when depressed.

It is yet another aspect of the present invention to provide a Belleville disk stack, in conjunction with the adjustable metering orifice, which provides a predetermined outlet pressure through the regulator. Adjustments to the outlet pressure may be made through the regulator, which may not be accessed during operation. Further, the regulator of the present invention is designed such that the pressure vessel and regulator as a unit, can be removed while at full maximum pressure, without the need for an on/off valve as found in other types of regulators.

It is yet another aspect of the present invention to provide a regulator that is designed and configured to allow the refilling of the pressure vessel through the regulator assembly, whether the pressure vessel and regulator assembly is attached to the main body assembly or not.

It is yet another aspect of the present invention to provide a regulator which provides multiple preset output pressures, gas through adjustment strut, easy field access bolt together body halves, contoured air passages for maximum flow characteristics, the ability to reseal the poppet assembly without disturbing the pressure setting, multiple excessive pressure safeties, tamper-proof pressure settings, enclosed adjustment strut in pressure vessel, stationary pin and moving seat as opposed to conventional moving pin and adjustment strut stationary seat configurations, seat-piston combination, and straight through (linear) air flow path that is non-reversing.

DETAILED DESCRIPTION OF THE PREFERRED EMBODIMENTS

The present invention is a single stage regulator, designed to accept input working pressures up to 4,500 PSI, and designed to regulate an output pressure of 700 to 1,000 PSI. The present invention is compatible with virtually all of the Paintball guns or markers currently used in the sport of Paintball.

The preferred embodiment of the present invention incorporates multiple preset output pressures, gas through adjustment strut, easy field access; bolt together body halves, contoured air passages for maximum flow characteristics, the ability to reseal the poppet assembly without disturbing the pressure setting, multiple excessive pressure safeties, tamper-proof pressure settings by enclosing adjustment strut within the pressure vessel, stationary pin and moving seat as opposed to conventional moving pin and adjustment strut stationary seat configurations, seat-piston combination, and straight through (linear) air flow path that is non-reversing.

Figure 1:
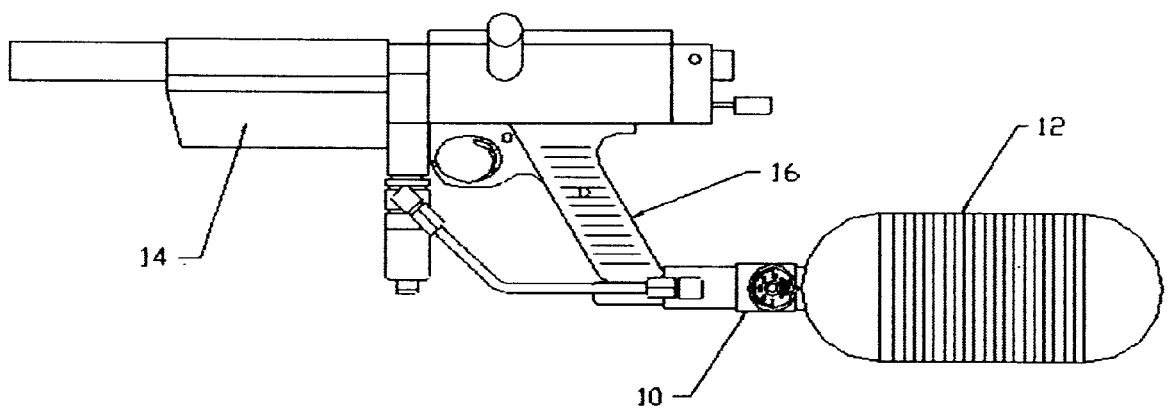
FIG. 1 is a side view of a regulator assembly fastened to a marker and a pressure vessel in accordance with the present invention.

FIG. 1 shows a complete Paintball system concept, including a single stage regulator system 10 in accordance with the present invention, attached to a high-pressure vessel 12, and a marker 14, ready to be used. The pistol grip 16 on the marker 14 is where the regulator assembly 10 will be connected. The regulator 10 is described in more detail below.

Prior to attaching the regulator 10 and vessel 12 to the marker 14, the regulator 10 becomes operative with a form of compress air/gas compatible with those normally used in conjunction with the sport of Paintball. This would be done through a rated fill nipple and one-way check valve (not shown). The regulator 10 and vessel 12 is now filled and ready to go. The regulator 10 is screwed into the marker 14, by screwing the male CGA portion of the regulator 10 into a female adapter (of the same thread design) either located remotely or on a marker 14. The regulator 10 and vessel 12 system will fill the marker 14 and the marker lines to a factory set preset output pressure, in the preferred embodiment, about 700 to 1,000 PSI.

Figure 2:
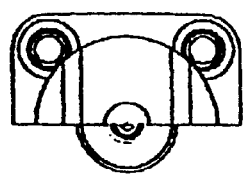
FIG. 2 is a sectional view of a regulator assembly for markers in accordance with the present invention.
Figure 2:
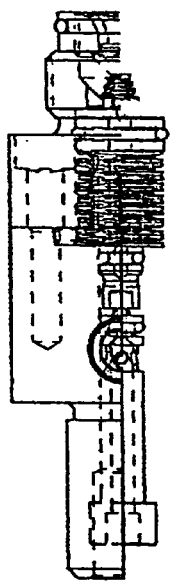
Figure 2:
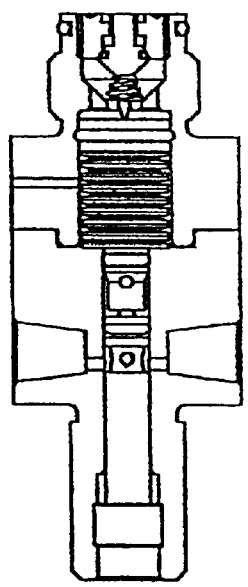
Figure 2:
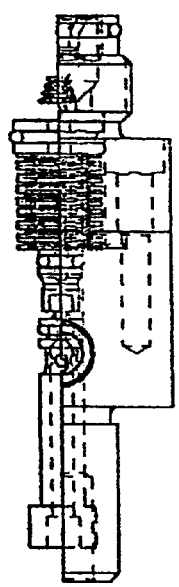
Figure 2:
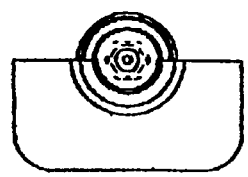

FIG. 2 shows a sectional view of the regulator assembly 10 in accordance with the present invention. As will be described in detail herein, the regulator assembly 10 locates between the vessel 12 and the marker 14 when in use. The regulator assembly 10 also provides an outlet for connecting a pressure status gauge to monitor the pressure vessel levels.

The regulator assembly 10 is precision machined and made from stainless steel and high strength aluminum, although other high strength materials can be used in the manufacture of the device.

In the present invention, the regulator assembly 10 is semi-permanently connected to the high-pressure bottle or vessel 12, and is not intended to be removed. When the compressed air/gas falls below the operational pressure level the pressure vessel 12, can be refilled through a port on the regulator assembly 10, as described below.

Figure 3:
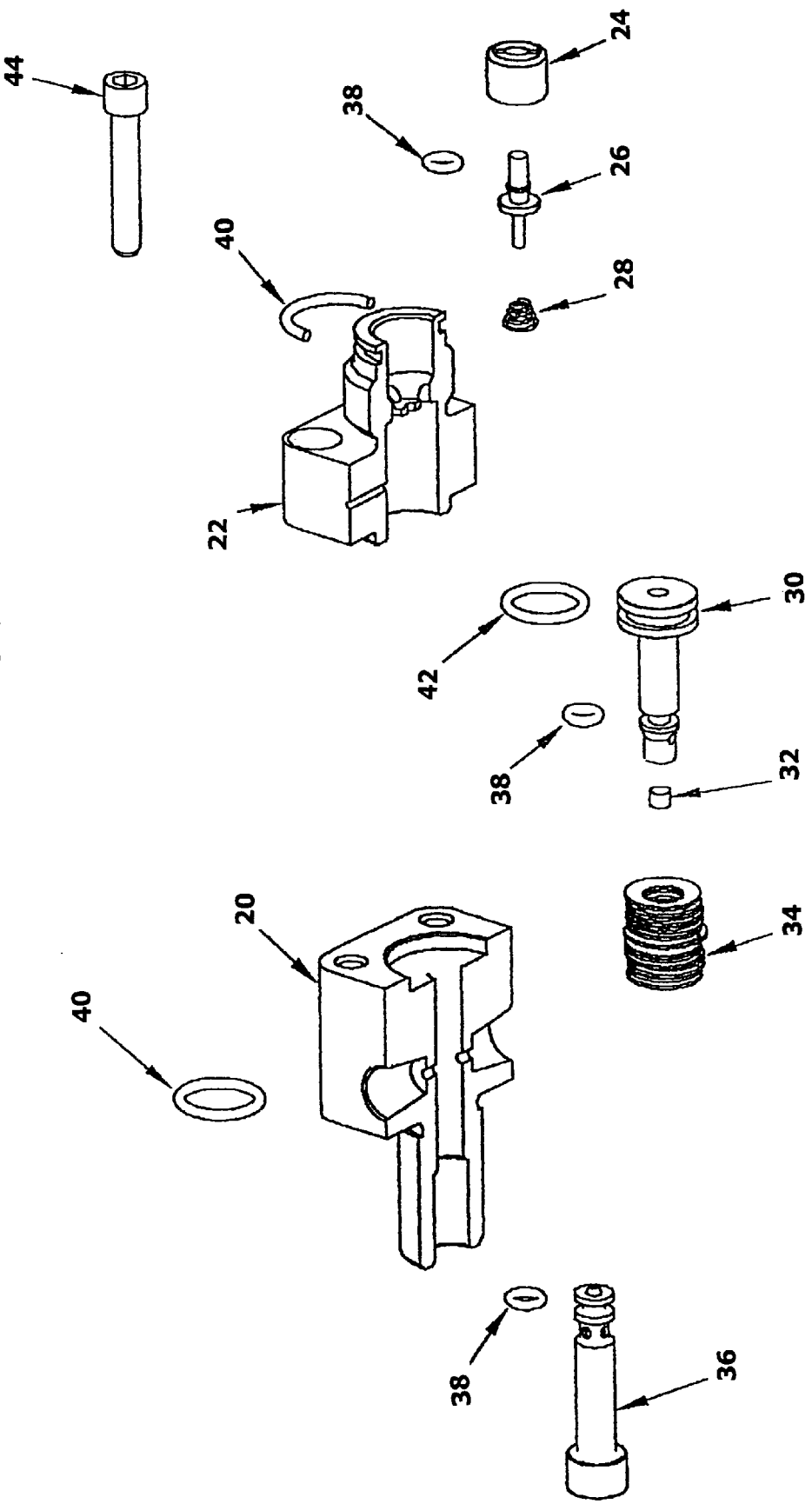
FIG. 3 is an exploded sectional view of a regulator assembly for markers in accordance with the present invention.

FIG. 3 shows an exploded view of the regulator assembly 10 in accordance with the present invention. The regulator assembly includes the gas distribution body 20, the piston housing 22, the poppet carrier 24, the poppet pin 26, the poppet spring 28, the piston 30, the piston O-ring 32, the Belleville disk springs 34, the adjustment strut 36, the adjustment strut O-rings 38, the pressure vessel O-ring 40, the piston housing O-ring 42, and the socket head cap screw 44.

The regulator assembly 10 also contains a high-pressure inlet male fitting (not shown) used for filling the pressure vessel 12, such as the Air America standard Q/Fill fitting. The male fitting attaches to the regulator 10 and can be used with a fill station containing a suitably rated female fitting. When the pressure vessel 12 falls below the operational levels, the filling station containing the female fitting is connected to the regulator assembly 10 at the high-pressure inlet male fitting, and high pressure gas, air or nitrogen is transferred from the filling station through the regulator assembly 10 and into the high-pressure bottle 12. FIG. 2 shows the regulator assembly 10 parts interconnected with each other in accordance with the present invention.

FIG. 3 shows each of the parts of the regulator assembly 10. The gas distribution body 20 is the main distribution body and attachment point for the base of the regulator assembly 10. The gas distribution body 20 houses certain regulator systems such as the adjustment strut 36, the excessive pressure safeties (not shown), which relieve pressure at a predetermined point if it becomes to high for safe application, the fill nipple assembly (not shown), which is a one-way check valve that allows the user to "recharge" the pressure vessel 12, and the gauge (not shown), which enables the user to monitor the pressure of the vessel 12. The gas body 20 screws into the pressure vessel 12 via a ⅝-inch, 18 threads per inch male thread, and are configured to accept the pressure vessel O-ring seal 40 containing the compressed gases.

The piston housing 22 is bolted to the gas body 20. The piston housing 22 houses the poppet 26, the spring 28, and the piston 30 (and related parts). The gas distribution body 20 and the piston housing 22 make up the exterior portion of the regulator assembly 10.

The poppet carrier 24 holds the poppet assembly in place and is also used to create a low side seal during static applications. The poppet pin 26 engages and disengages the transfer of regulated (output) pressure. While the poppet spring 28 ensures the return of the poppet pin 26 to the closed position (and also locates the poppet pin 26 during assembly).

The piston 30 has multiple functions. It is used as guide for the Belleville disk springs 34, a carrier assembly for the piston O-ring 32, adjustment strut O-rings 38, and piston housing O-ring 42, and acts as an air manifold to direct air. The regulator seat 38 seals the space between the piston 30 and the adjustment strut 36.

The Belleville disk springs 34 are configured such that a determined amount of spring energy can build to offset compressed gas pressure energy. The Adjustment Strut 36 is an air manifold, which directs high-pressure compressed gases from storage vessel 12 and from the fill port. Additional O-rings are used to provide a seal between different pressure chambers. The adjustment strut O-ring 38 provides a seal to the adjustment strut 36. The pressure vessel O-ring 40 is used to seal the compressed gasses within the pressure vessel 12 from the ambient air. The piston housing O-ring 42 provides a seal between the piston 30 and the housing 22. Finally, the socket head cap screw 44 securely attaches the piston housing 22 to the gas distribution body 20, providing the ease of removal necessary for field accessibility.

Once the regulator assembly 10 has been removed from it's packaging, and the several safety caps, which are installed at the factory to warn the user of proper usage as well as ensure that no foreign material enters the system during shipment have been removed, the regulator assembly 10 is ready to be charged/filled and used.

As described above, the regulator 10 and vessel 12 are usually combined together and not intended to be separated. When the vessel 12 is empty, filling of the pressure vessel 12 can take place through the regulator assembly 10. Initially, the vessel 12 must be filled with a form of compress gas compatible with those normally used in conjunction with the sport of Paintball. This would be done through a rated fill nipple (not shown) and one-way check valve (not shown). In order to fill the vessel 12, the compressed gas will pass through the gas distribution body 20, across the ports of the adjustment strut 36 and down into the pressure vessel 12 for storage. Once the pressure vessel 12 filled, the system is ready to go.

First, the regulator assembly 10 and vessel 12 are attached to the marker 14 by screwing the male CGA portion of the regulator 10 into a female adapter (of the same thread design) either located remotely or on a Paintball marker 14. Once attached, the vessel 12 and regulator system 10 will fill the marker 14 and the lines to a factory set preset output pressure, in the preferred embodiment about 700 to 1,000 PSI. The marker 14 is now ready for firing.

When the user pulls the trigger on the marker 14, a demand is created for the propellant gas. The gas travels from the regulator assembly 10 into the marker 14, and forces or expels the paint ball (not shown) from the marker 14.

Once the propellant exits the regulator assembly 10, the pressure therein is reduced. This reduction in pressure forces the regulator seat 38 to unseal as described more fully herein, thereby allowing the regulator assembly 10 to again fill and regulate an amount of propellant.

In particular, once the marker 14 is connected to the regulator assembly 10, compressed gas travels from the vessel 12 up through the adjustment strut 36, which is set at a predetermined depth for the desired system output pressure within design parameters. In the preferred embodiment, the adjustment strut is set to a depth based on the relationship between the adjustment strut face and the regulator seat face. The compressed air/gas applies pressure to the adjustment strut O-ring 38, and exits the top of the adjustment strut 36. Simultaneously, the gas applies pressure to the high-pressure safety assembly (not shown) whose port is located between the fill and gauge ports on the same plane.

The gas (and pressure) crosses the regulator seat 32 utilizes the piston 30 as an air manifold and makes contact with the top of the piston 30. At the same time, the gas applies pressure to the low-pressure safety assembly (not shown), whose port is located within the gas distribution body 20 opposite the high-pressure safety port but slightly higher.

As the gas flows through to the piston 30, pressure is applied to the top of the piston 30 and the piston O-ring 42. The pressure applied to the top of the piston 30 is transferred to the array of Belleville disk springs 34. The energy developed by the compressed gas is applied to the energy generated by the Belleville springs 34. The balance of these two forces along with the gap between the regulator seat 32 and adjustment strut 36 acts to regulate airflow and pressure. The flow can be increased or decreased by altering the gap between the regulator seat 32 and the adjustment strut 36 based on compressed gas/spring energy. Hence, the pressure on the backside of the poppet pin 26 is regulated. The poppet pin 26 remains in a position (closed) thereby sealing off the upper portion of the piston housing 22 and the regulated gas is prohibited from passing to ambient air.

When the regulator system 10 is screwed into a female CGA thread equipped with a depressor pin, as those found in a standard marker 14, the depressor pin will engage the exposed portion of the poppet pin 26 and depress the poppet pin 26 against the poppet spring 28. Once the poppet pin 26 is forced away from the sealed position, regulated compressed gas will begin to flow across the poppet O-ring 38, and out into the female adapter, creating a pressure drop.

The introduction of a pressure drop to the "low side" of the regulator 10 causes the Belleville disk spring energy to overcome low side compressed gas pressure, thereby forcing the piston 30 upward. The gap between the regulator seat 32 and adjustment strut 36 increases. As described above, an increase in gap creates additional gas flow, which applies additional force to the topside of the piston 30. The piston 30 is driven back down against spring energy and closes the gap between the adjustment strut 36 and the regulator seat 32.

This process would continue each time a pressure differential is introduced to the system, i.e., whenever the marker 14 is fired, increasing the gap relative to pressure drop and pressure vessel storage pressure (high and low side pressures).

As discussed above, the regulator assembly 10 is connected to the pressure vessel 12, and should not be removed. A pressure status gauge (not shown) can be connected to the regulator assembly 10, thereby providing the user with a storage vessel pressure reading. The filled vessel 12 and regulator assembly 10 are next connected to the pistol grip 16 of the marker 14. The system is now ready to be used.

As stated previously, the vessel 12 can be filled when it is attached to the system or remotely. Further, the regulator assembly allows for the easy removal of the pressure vessel 12 from the marker 14, whether or not the vessel 12 is empty, without the need for a separate on/off valve. Vessels 12 can be removed from and reinserted on the marker 14 under full pressure, "by hand" without the use of any clamping or holding device other than a moderate grip.

The foregoing detailed description of the invention is intended to be illustrative and not intended to limit the scope of the invention. Changes and modifications are possible with respect to the foregoing description, and it is understood that the invention may be practiced otherwise than that specifically described herein and still be within the scope of the claims.

What is claimed is:

1. A single stage regulator for use on a marker, comprising:

a gas distribution body, said gas distribution body comprising an adjustment strut and an attachment point, said attachment point located at one end of the gas distribution body and configured to be attached to a pressure valve;

a piston housing, said piston housing being attached to said gas distribution body by a socket head cap screw, wherein said socket head cap screw provides for ease of removal of said piston housing from said gas distribution body;

said piston housing comprising a poppet carrier, a poppet pin, a poppet spring, a Belleville disk spring, and a piston, said piston being located within and acting as a guide for said Belleville disk springs, said piston directing air from said pressure vessel;

said Belleville disk spring configured such that a determined amount of spring energy can be used to offset gas pressure energy, wherein said Belleville disk spring and adjustment strut are configured such that said single stage regulator can accept input compressed air at up to 3000 PSI and to deliver compressed air at 700 to 1,000 PSI.

* * * * *